United States Patent
Canada et al.

(10) Patent No.: US 10,902,844 B2
(45) Date of Patent: Jan. 26, 2021

(54) ANALYSIS OF CONTENT SOURCES FOR AUTOMATIC GENERATION OF TRAINING CONTENT

(71) Applicant: International Business Machines Corporation, Armonk, NY (US)

(72) Inventors: Tracy Canada, Angier, NC (US); Eduardo Kaufmann-Malaga, El Cerrito, CA (US); Jim Dewan, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 16/031,575

(22) Filed: Jul. 10, 2018

(65) Prior Publication Data
US 2020/0020318 A1   Jan. 16, 2020

(51) Int. Cl.
G06F 17/27 (2006.01)
G10L 15/06 (2013.01)
G10L 15/22 (2006.01)
G06F 16/35 (2019.01)
G06F 16/332 (2019.01)

(52) U.S. Cl.
CPC ........ G10L 15/063 (2013.01); G06F 16/3329 (2019.01); G06F 16/35 (2019.01); G10L 15/22 (2013.01)

(58) Field of Classification Search
CPC .................................................... G06F 17/02
USPC .......................................... 704/1, 9, 10, 257
See application file for complete search history.

(56) References Cited

U.S. PATENT DOCUMENTS

| | | |
|---|---|---|
| 9,208,147 B1 | 12/2015 | Nichols et al. |
| 9,754,207 B2 | 9/2017 | Allen et al. |
| 10,169,706 B2 | 1/2019 | Allen et al. |
| 2011/0113032 A1 | 5/2011 | Boscolo et al. |
| 2011/0314011 A1 | 12/2011 | Buehrer et al. |
| 2012/0078636 A1* | 3/2012 | Ferrucci ............. G06F 16/3329 704/270.1 |
| 2012/0233160 A1 | 9/2012 | Koomullil et al. |

(Continued)

OTHER PUBLICATIONS

Chu-Carroll et al. "Textual resource acquisition and engineering." IBM Journal of Research and Development 56.3.4 (2012): 4-1.

(Continued)

Primary Examiner — Jesse S Pullias
(74) Attorney, Agent, or Firm — Patterson + Sheridan, LLP

(57) ABSTRACT

Techniques for automated training content generation are provided. A plurality of questions are retrieved, where each of the plurality of questions is associated with an answer in a plurality of answers. Further, it is determined that a first and a second answer in the plurality of answers are equivalent. A first question corresponding to the first answer and a second question corresponding to the second answer are identified, and a first question cluster including the first question and the second question is generated. The first question cluster is associated with at least one of the first answer and the second answer. Finally, upon determining that a number of questions in the plurality of questions that are included in the first question cluster exceeds a first predefined threshold, the first question cluster is ingested into a question answering system.

18 Claims, 6 Drawing Sheets

(56) References Cited

U.S. PATENT DOCUMENTS

| | | | | |
|---|---|---|---|---|
| 2012/0301864 A1* | 11/2012 | Bagchi | ............... | G09B 7/02 434/362 |
| 2014/0272884 A1* | 9/2014 | Allen | ............... | G06N 20/00 434/322 |
| 2014/0272909 A1* | 9/2014 | Isensee | ............... | G09B 7/02 434/362 |
| 2015/0044659 A1* | 2/2015 | Basu | ............... | G09B 7/04 434/350 |
| 2016/0078361 A1 | 3/2016 | Brueckner et al. | | |
| 2016/0180237 A1* | 6/2016 | Ahuja | ............... | G06N 5/022 706/52 |
| 2016/0196491 A1 | 7/2016 | Chandrasekaran et al. | | |
| 2017/0124487 A1 | 5/2017 | Szeto et al. | | |
| 2017/0132288 A1 | 5/2017 | Ho et al. | | |
| 2017/0161619 A1 | 6/2017 | Franceschini et al. | | |

OTHER PUBLICATIONS

Fan et al. "Automatic knowledge extraction from documents." IBM Journal of Research and Development 56.3.4 (2012): 5-1.

Murtaza et al. "How to effectively train IBM Watson: Classroom experience." System Sciences (HICSS), 2016 49th Hawaii International Conference on. IEEE, 2016.

Haggender et al. "EIRA—An Application for Finding and Ranking Researchers." DISS, Chalmers University of Technology University of Gothenburg Department of Computer Science and Engineering Gothenburg, Sweden (2016).

Kelly III, "Computing, cognition and the future of knowing: How humans and machines are forging a new age of understanding." IBM Research (2015).

Xuguang Li, "A Study of Knowledge Construction in Virtual Product User Communities," University of Sheffield, Oct. 2014, 423 pages.

John Gero and Mary Lou Maher, "Computational and Cognitive Models of Creative Design VI," International Conferecne of Computational and Cognitive Models of Creative Design VI, Dec. 2005, 385 pages.

Disclosed Anonymously,"Knowledge Driven Approach to Determine Health of Cognitive Model," Dec. 4, 2018, IPCOM000256507D, 4 pages.

Disclosed Anonymously,"A Cognitive learning-based approach to find matching solution assets for new requirements from an existing client and project," Oct. 15, 2018, IPCOM000255801D, 4 pages.

Disclosed Anonymously,"A cognitive system to assess as soon as possible security exposures in a customer environment," Feb. 14, 2017, IPCOM000249244D, 6 pages.

* cited by examiner

ANALYSIS OF CONTENT SOURCES FOR AUTOMATIC GENERATION OF TRAINING CONTENT

BACKGROUND

The present disclosure relates to generation of ingestible content, and more specifically, to automatic generation of content for training and deployment of data models.

In computing systems, various data models (e.g., machine learning models) may be deployed to serve any number of goals. Generally, data models can be trained for virtually any purpose, including identification and classification of data (in images, text, video, audio, and the like), generation of new data (such as responses to input data), and the like. These models require rigorous training through ingestion of a large amount of data in order to provide satisfactory results. However, this training data is often difficult and costly to generate, and requires investment of significant time and resources. Further, the models risk becoming stale if new training data is not continuously generated and provided, and the costs of data generation can prevent sufficient refinement.

SUMMARY

According to one embodiment of the present disclosure, a method is provided. The method includes retrieving a plurality of questions, wherein each of the plurality of questions is associated with an answer in a plurality of answers, and determining, by operation of one or more computer processors, that a first and a second answer in the plurality of answers are equivalent. The method further includes identifying a first question corresponding to the first answer and a second question corresponding to the second answer, and generating a first question cluster including the first question and the second question. Additionally, the method includes associating the first question cluster with at least one of the first answer and the second answer. Finally, upon determining that a number of questions in the plurality of questions that are included in the first question cluster exceeds a first predefined threshold, the method includes ingesting the first question cluster into a question answering system.

According to a second embodiment disclosed herein, a computer program product is provided. The computer program product includes a computer-readable storage medium having computer-readable program code embodied therewith. The computer-readable program code is executable by one or more computer processors to perform an operation. The operation includes retrieving a plurality of questions, wherein each of the plurality of questions is associated with an answer in a plurality of answers, and determining that a first and a second answer in the plurality of answers are equivalent. The operation further includes identifying a first question corresponding to the first answer and a second question corresponding to the second answer, and generating a first question cluster including the first question and the second question. Additionally, the operation includes associating the first question cluster with at least one of the first answer and the second answer. Finally, upon determining that a number of questions in the plurality of questions that are included in the first question cluster exceeds a first predefined threshold, the operation includes ingesting the first question cluster into a question answering system.

According to a third embodiment disclosed herein, a system is provided. The system includes one or more computer processors, and a memory containing a program which when executed by the one or more computer processors performs an operation. The operation includes retrieving a plurality of questions, wherein each of the plurality of questions is associated with an answer in a plurality of answers, and determining that a first and a second answer in the plurality of answers are equivalent. The operation further includes identifying a first question corresponding to the first answer and a second question corresponding to the second answer, and generating a first question cluster including the first question and the second question. Additionally, the operation includes associating the first question cluster with at least one of the first answer and the second answer. Finally, upon determining that a number of questions in the plurality of questions that are included in the first question cluster exceeds a first predefined threshold, the operation includes ingesting the first question cluster into a question answering system.

DETAILED DESCRIPTION

Cognitive models require large training sets in order to function accurately and reliably. To provide the needed data, existing solutions rely on extensive manual generation and curation of training data. This manual process is expensive, time-consuming, and difficult. Moreover, the inherent inefficiencies in manual curation prevent rapid refinement or updating of the models. Models that rely on manual generation can thus easily become stale, meaning that the model's operations do not adequately reflect the current formats, standards, and preferences of the users and systems that rely on the models. Models which are not routinely updated may also suffer reduced efficiency and accuracy, as the performance of the model suffers when the input data differs from the data used in training. In addition to the significant costs and time required, manual curation is simply unable to keep up with evolving and changing systems and data.

Embodiments of the present disclosure provide a system for search and interrogation of content sources in order to automatically generate training data, consumable information, or ingestible content for data models. In an embodiment, a data model may be a machine learning model, a cognitive model, or other trained models (including both supervised and unsupervised models). In one embodiment, data models may also include untrained models, such as systems that search or parse corpuses of data, without actively training or learning based on the data. In an embodiment, the term data model generally refers to any computer model that utilizes a corpus of data in its operation. Embodiments of the present disclosure allow for the rapid, affordable, and efficient training and deployment of cognitive models. Further, embodiments of the present disclosure improve the models and systems themselves by enabling continuous automated processing of new content sources that were not previously considered, as well as determinations of new content that should be ingested in order to ensure the models remain accurate. To do so, embodiments of the present disclosure retrieve data from various content sources and identify patterns, clusters, and relationships in the data. The data can then be intelligently processed and ingested.

Figure 1:
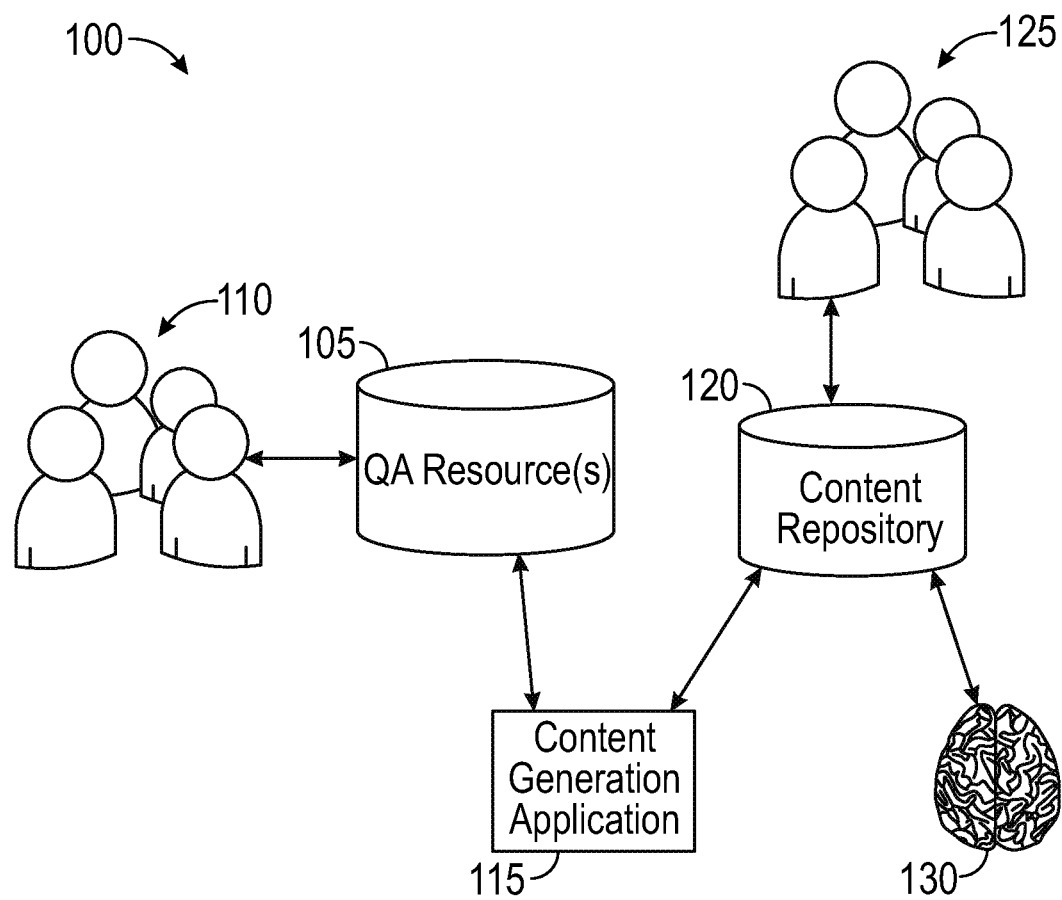
FIG. 1 illustrates a system configured to automatically generate content for ingestion into a trained model, according to one embodiment disclosed herein.

FIG. 1 illustrates a system 100 configured to automatically generate content for ingestion into a trained model, according to one embodiment disclosed herein. In the illustrated system 100, a Content Generation Application 115 searches and retrieves data from one or more Question and Answer (QA) Resource(s) 105, and generates a training corpus, stored in the Content Repository 120. As illustrated, a Question Answering System 130 can then be trained based on the corpus in the Content Repository 120, in order to response to questions and interactions with users. In the present disclosure, although question answering systems are discussed as examples, any other systems and models may be used. Generally, any model or structure that utilizes a Content Repository 120 may utilize the Content Generation Application 115 to maintain the corpus.

In one embodiment, the Question Answering System 130 may operate as a digital assistant, helper, or chat bot. For example, in one embodiment, the Question Answering System 130 receives queries and other information from users, determines a response based at least in part on the Content Repository 120, and responds to the user. In order to ensure the Question Answering System 130 operates effectively, in an embodiment, the Content Generation Application 115 populates and curates the Content Repository 120. In the illustrated embodiment, a group of Users 110 interacts with one or more QA Resource(s) 105. In one embodiment, each QA Resource 105 represents a source of data that generally includes a various questions on any number of topics, each with one or more respective answers. For example, in an embodiment, the QA Resources 105 may include forums, frequently asked questions (FAQs), feedback websites, social media, and the like.

In the illustrated embodiment, the Users 110 use the QA Resource 105 to ask and answer questions. In some embodiments, only verified or trusted users may answer questions, while any user can post a question. For example, in some embodiments, only subject matter experts (SME) in the corresponding topic are allowed to respond to questions. In other embodiments, any user may provide an answer. In an embodiment, each QA Resource 105 may also be structured differently. For example, some may allow any user to answer, while some restrict answering to experts or verified users. Similarly, some QA Resources 105 may allow only a single answer for each submitted question, while other QA Resources 105 allow multiple answers to be submitted. In some embodiments, the Users 110 may vote on the submitted answer(s) to determine the quality of each answer. Each vote may be a rating or score, or a binary approve/disapprove vote. In an embodiment, the QA Resource(s) 105 and/or the Content Generation Application 115 may score each answer based on the collected votes, the user who provided the answer, and the like.

In one embodiment, the Content Generation Application 115 identifies and retrieves questions from the QA Resources 105, as well as one or more answers corresponding to each identified question. In one embodiment, the Content Generation Application 115 may retrieve all available answers. In another embodiment, the Content Generation Application 115 retrieves only the best answer for each question (as determined by the corresponding answer scores), or only the top few answers. In a related embodiment, the Content Generation Application 115 retrieves any answers with a score above a predefined threshold. In embodiments, the number of answers to retrieve (or the minimum acceptable score) may be determined by a user or administrator.

In an embodiment, the Content Generation Application 115 analyzes each of the retrieved answers (or the answer with the highest score for each of the retrieved questions) to identify equivalent answers that were provided for different questions. In some embodiments, two answers may be considered equivalent if they are identical or the same. In some embodiments, two answers are considered equivalent if a computed similarity measure exceeds a predefined threshold. In one embodiment, each answer is processed using one or more natural language processing (NLP) models, and the results may be compared in order to compute similarity measures. In some embodiments, the answers may be vectorized (i.e., using a model such as Word2Vec), and the vector representations may be compared to determine how closely-related the answers are in the multi-dimensional vector space.

In some embodiments, when two answers are determined to be equivalent (or it is determined that the similarity measure exceeds a threshold), the Content Generation Application 115 identifies the corresponding questions for each answer, and generates a question cluster including both questions. Similarly, if other equivalent answers are found, the questions corresponding to each of the identified equivalent answers can be included in the question cluster. In this way, a number of clusters can be created, based on determining that the corresponding answers are equivalent. In some embodiments, each question in a given question cluster is considered to be an alternative way to ask the same question, because their respective answers are considered equivalent. That is, in an embodiment, each question a given question cluster can be responded to with a single common answer.

In some embodiments, prior to assigning each question to a cluster, the Content Generation Application 115 further determines whether the questions belong to the same class. In one embodiment, one or more NLP models, such as a natural language classifier, are used to determine the intent or class of each question. For example, a first class or intent of a question may be seeking "how-to" information about how to accomplish a task, while a second class or intent may correspond to "troubleshooting." In various embodiments, other classes or intents may include seeking documentation, requesting information or statistics, and the like. In an embodiment, a question's class or intent generally refers to the intentions of the user who asked the question, with respect to what sort of response and information is desired.

In one embodiment, even if two questions have identical answers, they are assigned to differing clusters if it is determined that their corresponding questions are associated with differing classes. That is, even if two questions yield identical answers, they may not be alternative ways to phrase the same request if the underlying intent or class is different. For example, the answer to both "what is the coldest state?" and "what is the largest state?" is "Alaska," but the questions belong to different classes, and are not alternative ways to phrase the same request or intent. Specifically, in an embodiment, even though both seek information or statistics, the first question's class or intent relates to temperature or weather, while the second question's class involves geography. Thus, in an embodiment, one or more natural language classifiers are used to parse each question to identify the class or intent of the respective question, in order to ensure that each question cluster includes only questions with matching intent.

In addition to generating clusters of questions, in an embodiment, the Content Generation Application 115 determines and assigns an answer to each cluster. In some embodiments, as discussed above, each of the questions in a cluster has an identical answer. In such an embodiment, the Content Generation Application 115 associates this answer with the cluster. In some embodiments, the answers may differ in their phrasing, length, detail, clarity, and the like. In order to determine which answer to associate with the cluster, the Content Generation Application 115 may consider a variety of factors. In one embodiment, the Content Generation Application 115 selects a representative answer based at least in part on the score associated with each answer. For example, if a first answer has a score of 9.8 while a second answer has a score of 5.7 (as determined based on, for example, votes and feedback from the Users 110), the Content Generation Application 115 may identify the first answer as the "best" or "better" answer, and assign this first answer as the representative answer for the cluster.

In some embodiments, the Content Generation Application 115 may also consider other factors when identifying the representative answer for each cluster. For example, in one embodiment, the Content Generation Application 115 considers the length of each answer (longer or shorter answers may be preferred, depending on the particular implementation or question intent), the particular User 110 who provided the answer (e.g., their qualifications, how many answers they have provided, how other Users 110 have scored or graded the user, and the like), the complexity or detail included in the answer, and the like. In this way, in an embodiment, the Content Generation Application 115 identifies the best answer for a given question cluster.

In one embodiment, each question cluster (along with its corresponding answer) is then stored in the Content Repository 120, where it can be used to train or refine various models, such as the Question Answering System 130. In some embodiments, the Content Generation Application 115 scans the QA Resources 105 continuously or periodically to process additional new questions and answers. For example, in one embodiment, the Content Generation Application 115 periodically polls the QA Resources 105 for new data (i.e., every hour, every day, and the like). Each new question and answer combination can then be processed as discussed above to identify the cluster (if any) to which the question belongs. Similarly, in an embodiment, each new answer can be processed to determine whether it should become the representative answer for the cluster, or whether the original answer should remain.

In some embodiments, the generated clusters and corresponding answer(s) may be stored in the Content Repository 120 and used by the Question Answering System 130 immediately. In some embodiments, however, one or more Users 125 may review each generated cluster prior to ingestion, in order to ensure that the generated content is accurate. For example, in one embodiment, the clusters are provided to one or more Users 125 (i.e., the list of questions in the cluster are provided) and displayed on a graphical user interface (GUI) for the User 125 to determine whether any of the questions do not belong in the cluster. This may be based on, for example, determining that the intent or class of the particular question does not match the rest of the questions in the cluster, that the cluster's corresponding answer is inaccurate or incomplete for the particular question, or simply that the particular question is not related to the cluster or is not another way to phrase the same question.

In some embodiments, the Users 125 are subject matter experts (SME), or are otherwise verified and trusted. In some embodiments, question clusters may only be presented for approval or ingestion once the size of the cluster (i.e., the number of questions in the cluster) exceeds a predefined threshold. This ensures that the Question Answering System 130 only ingests data related to questions which are asked relatively frequently, or which have been asked above a predefined number of times, which can reduce inaccuracies and improve efficiency. Similarly, requiring that each cluster reach a predefined size reduces the labor required by the Users 125 and reduces resource consumption, as only questions that are sufficiently popular or common are processed.

In some embodiments, the Users 125 may approve or reject each question individually. If the question is rejected, the Content Generation Application 115 removes it from the cluster. In an embodiment, the cluster is then ingested to train or refine the Question Answering System 130. In some embodiments, the Content Generation Application 115 may refine the various NLP models and classifiers based on this rejection, in order to improve future results. In some embodiments, the Content Generation Application 115 may also reprocess the question and corresponding original answer, in order to determine whether the question should be added to a different cluster, should be used to start a new cluster, or should be discarded.

In an embodiment, the Question Answering System 130 may rely on the Content Repository 120 to respond to user input. For example, in one embodiment, new questions from users may be parsed with one or more NLP models (including one or more natural language classifiers) to determine the intent and purpose of the question. In one embodiment, the Question Answering System 130 compares the question to each cluster to generate a confidence measure for each cluster, representing the confidence that the new question belongs to the respective cluster. If the highest confidence measure exceeds a predefined threshold, the Question Answering System 130 may determine that the user's question fits into the corresponding cluster. The Question Answering System 130 may then identify the corresponding representative answer associated with the cluster, and return this answer to the user. If none of the confidence measures exceeds the threshold, the Question Answering System 130 may request additional information to determine which cluster the question belongs to.

In this way, the Content Generation Application 115 can interrogate the QA Resources 105 to generate new content in the form of question clusters with representative answers. These clusters may then be utilized to improve the performance of data models, such as the Question Answering System 130. Advantageously, rather than relying on SME to manually create each alternative question, the Content Generation Application 115 can dynamically generate these clusters. This reduces the time and expense associated with content generation, which allows for increased scalability.

For example, additional QA Resources 105 can be parsed that could not otherwise be accessed, and additional data from each QA Resource 105 can be analyzed. Further, embodiments of the present disclosure enable continuous or periodic refinement and improvement of the models, by automatically identifying and processing new data to determine whether it should be ingested into the corpus, as well as how it should be ingested.

Figure 2:
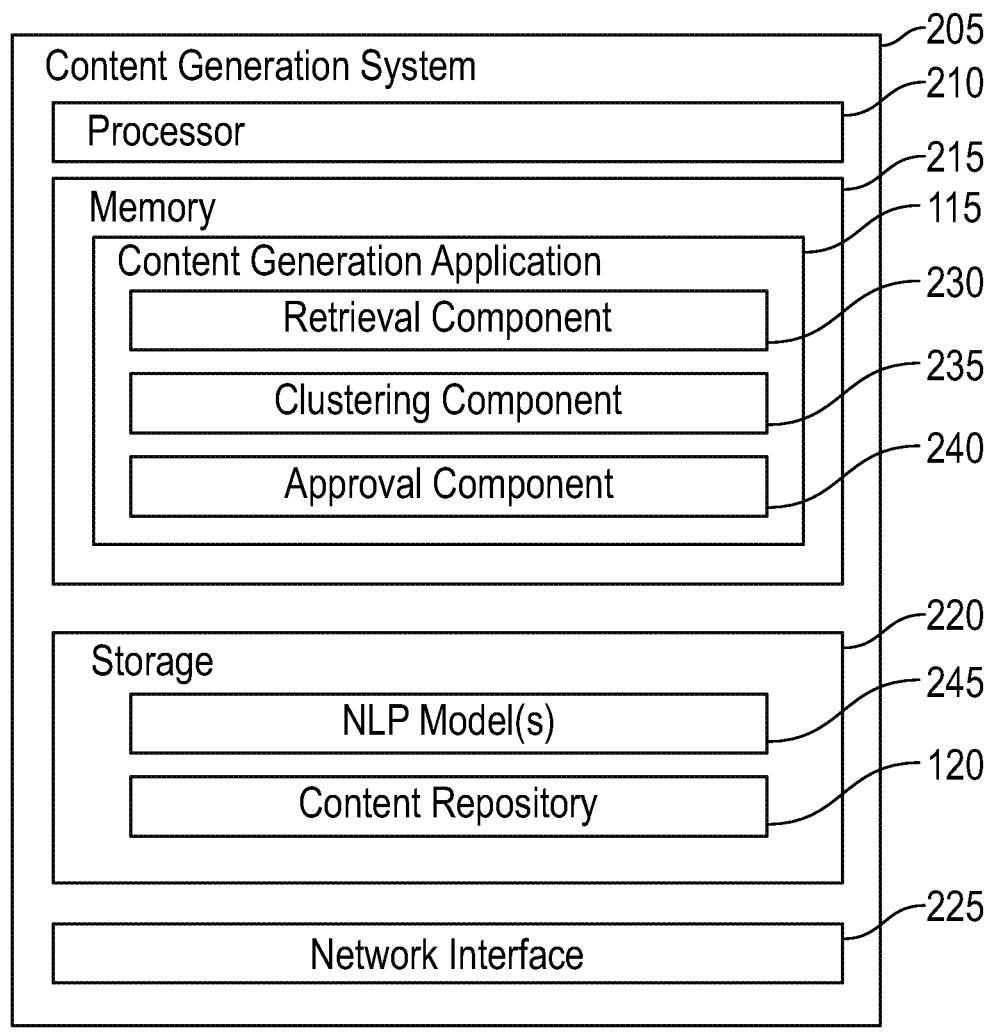
FIG. 2 is a block diagram of a content generation system for automatic generation of consumable content for use with training and deploying trained models, according to one embodiment disclosed herein.

FIG. 2 is a block diagram of a Content Generation System 205 for automatic generation of consumable content for use with training and deploying trained models, according to one embodiment disclosed herein. In the illustrated embodiment, the Content Generation System 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Content Generation System 205 may be communicatively coupled with other devices, including QA Resources 105, the Content Repository 120, and the like.

Although illustrated as a single device, in embodiment, the Content Generation System 205 may operate as part of a distributed system across one or more devices. In the illustrated embodiment, the Storage 220 includes one or more NLP Models 245 (which may include natural language classifiers), and a Content Repository 120. Although illustrated as if it resides in the Storage 220, in embodiments, the Content Repository 120 may reside on one or more remote devices or systems. As illustrated, the Memory 215 includes a Content Generation Application 115. The Content Generation Application 115 includes a Retrieval Component 230, a Clustering Component 235, and an Approval Component 240. In an embodiment, the Retrieval Component 230 parses QA Resources 105 to identify and retrieve questions and their corresponding answer(s) via the Network Interface 225.

In the illustrated embodiment, the Clustering Component 235 uses the NLP Models 245 to process each of the questions and answers to generate clusters, as discussed above. For example, in an embodiment, the Clustering Component 235 identifies matching answers (i.e., answers that are equivalent), and determines (using the NLP Models 245 or classifiers) whether the corresponding questions belong to the same class or intent. If so, the Clustering Component 235 assigns the questions to the same cluster. In this way, a number of clusters are dynamically created. Further, in an embodiment, the Clustering Component 235 determines which particular answer should become the representative answer for each cluster, and associates the identified answer with the cluster.

Further, in the illustrated embodiment, the Approval Component 240 processes each cluster to determine whether (and when) to ingest the cluster into whatever model(s) rely on the Content Repository 120. For example, in an embodiment, the Approval Component 240 compares the size of each cluster to a predefined threshold, and only advances clusters which satisfy the criteria. In some embodiments, the Approval Component 240 may forward the clusters for immediate ingestion. In other embodiments, the Approval Component 240 may transmit the clusters which meet the threshold size to one or more devices used by Users 125 (i.e., subject matter experts) for approval. When they are approved, the Approval Component 240 may forward the approved clusters for ingestion.

In addition to transmitting clusters meeting a predefined minimum size for approval or ingestion, in some embodiments, the Approval Component 240 further determines when to transmit new data for approval or ingestion. For example, as discussed above, in some embodiments, new questions may be added to clusters as they are identified in the QA Resources 105. Similarly, in some embodiments, questions provided by users of the Question Answering System 130 may be retrieved by the Retrieval Component 230 for processing and potential ingestion. In some embodiments, the Approval Component 240 may advance this new data down the pipeline once the number of new questions reaches a second predefined threshold. For example, in an embodiment, when a new question is added to a cluster that has already been approved, the size of the cluster may already exceed the first threshold. Rather than send each new question for immediate approval or ingestion, in an embodiment, the Approval Component 240 first determines whether the number of new questions exceeds a second threshold. This prevents the data from being forwarded until sufficient new questions are identified.

Figure 3:
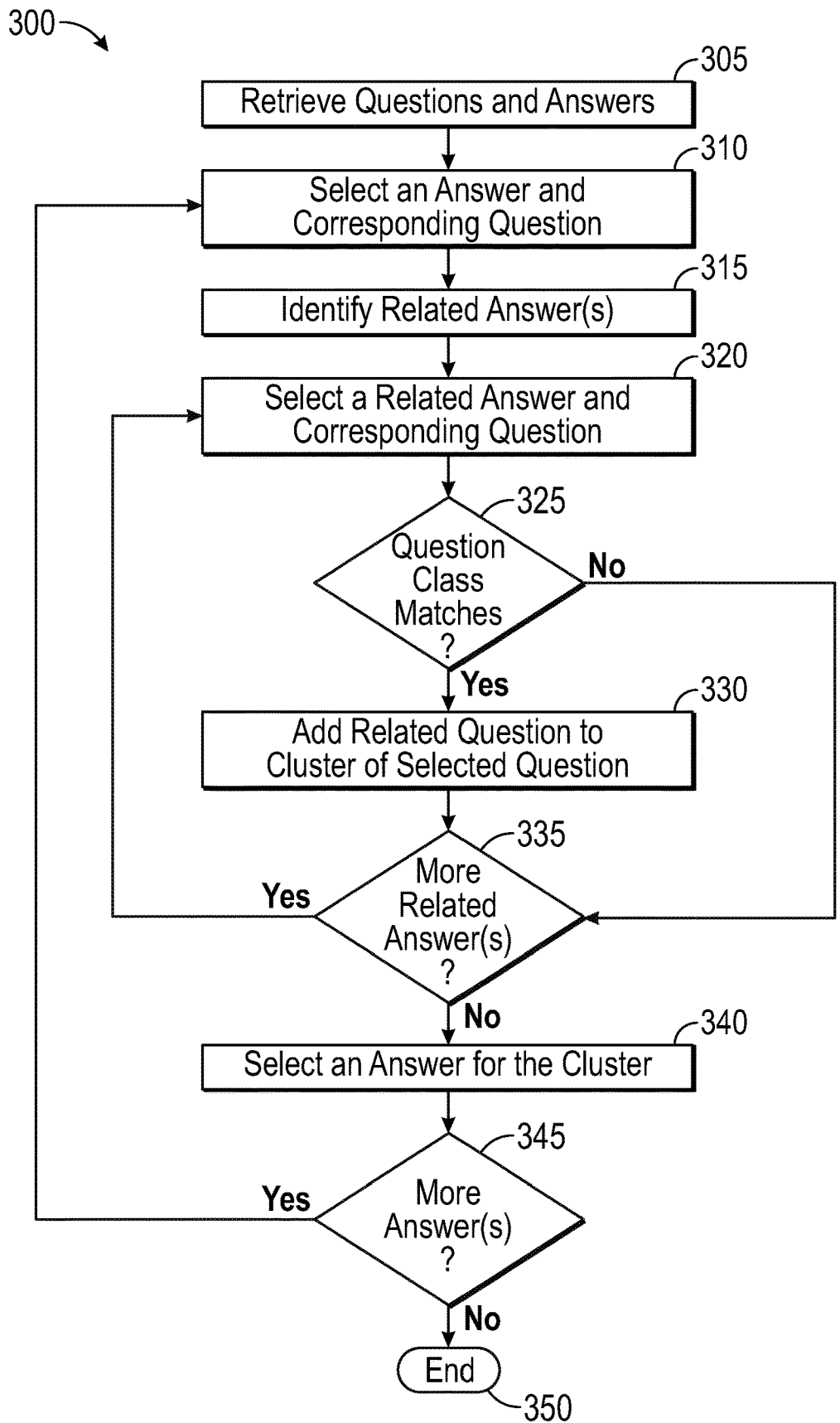
FIG. 3 is a flow chart illustrating a method for automatic generation of ingestible training content, according to one embodiment disclosed herein.

FIG. 3 is a flow chart illustrating a method 300 for automatic generation of ingestible training content, according to one embodiment disclosed herein. The method 300 begins at block 305, where the Retrieval Component 230 retrieves a plurality of questions from one or more QA Resources 105, along with one or more corresponding answer for each question. At block 310, the Clustering Component 235 selects a first answer, along with the corresponding question. The method 300 then proceeds to block 315, where the Clustering Component 235 identifies any related answers. For example, as discussed above, in an embodiment, the Clustering Component 235 identifies equivalent answers, or answers with a computed similarity measure that exceeds a predefined threshold. In one embodiment, if there are no related answers identified, the Clustering Component 235 creates a new cluster and assigns the question to this new cluster. The method 300 may then proceed to block 340, discussed below. At block 320, the Clustering Component 235 selects a first one of the identified related answers, along with the question that corresponds to the related answer.

The method 300 then proceeds to block 325, where the Clustering Component 235 determines whether the question corresponding to the selected related answer matches the class of the originally selected question. That is, if the Clustering Component 235 selected a first answer and a first question in block 310, and selected a second answer and a second question in block 320, then in block 325, the Clustering Component 235 determines whether the class or intent of the first question matches the class or intent of the second question. As discussed above, this may be accomplished using one or more NLP models, such as natural language classifiers, to identify the intent of each question and/or the concepts included in each question. In various embodiments, this intent may be defined broadly or narrowly, depending on the particular implementation. For example, the intent may be related to the type of information sought or action to be completed. Similarly, in embodiments, the intent may be related to the concepts included in the question (e.g., weather, geography, and the like).

If the Clustering Component 235 determines that the question classes match (which may indicate that the questions represent alternative ways to phrase the same question), the method 300 continues to block 330, where the Clustering Component 235 adds the selected related question to the cluster associated with the originally selected question. To do so, in one embodiment, the Clustering Component 235 first determines whether the first question (selected in block 310) is already associated with a cluster. If so, the second question (selected in block 320) is added to that cluster. If the first question is not already associated with a cluster, in an embodiment, the Clustering Component 235 may generate a new cluster and assign both questions to it. The method 300 then proceeds to block 335. Additionally, if, at block 325, it is determined that the question classes do not match, the method 300 proceeds to block 335.

At block 335, the Clustering Component 235 determines whether there is at least one additional related or equivalent answer which was identified in block 315. If so, the method 300 returns to block 320, where the Clustering Component 235 selects the next related answer and its corresponding question. If not, the method 300 proceeds to block 340, where the Clustering Component 235 determines a representative answer for the cluster associated with the first question (selected in block 310). As discussed above, in embodiments, this may comprise selecting the first answer that was identified by the Retrieval Component 230, selecting an answer based on a score associated with each answer in the question cluster, and the like. The method 300 then proceeds to block 345, where the Clustering Component 235 determines whether there are additional answers to be processed which have not yet already been assigned to a cluster. If so, the method 300 returns to block 310. Otherwise, the method 300 terminates at block 350.

Figure 4:
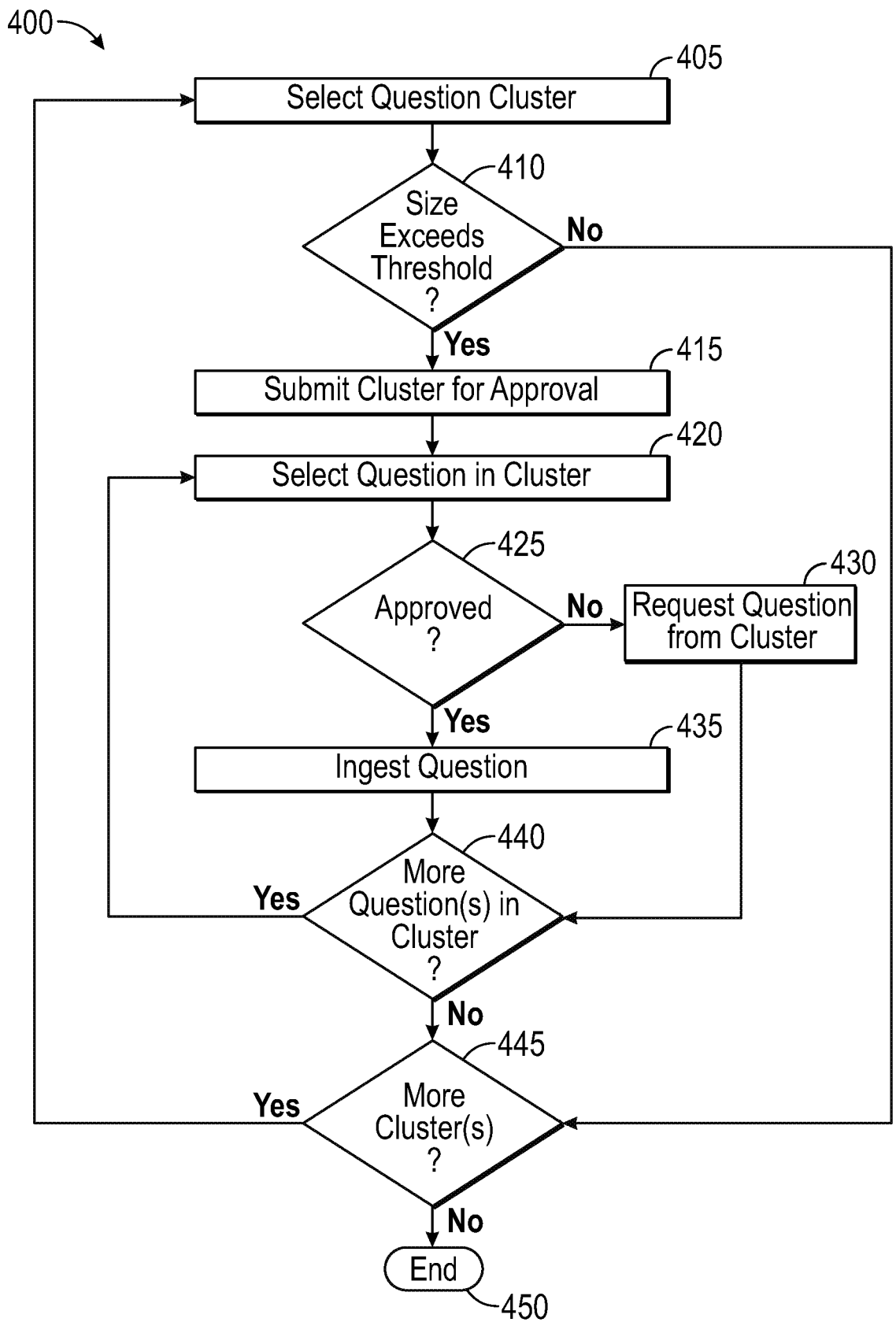
FIG. 4 is a flow chart illustrating a method for ingestion of automatically-generated content, according to one embodiment disclosed herein.

FIG. 4 is a flow chart illustrating a method 400 for ingestion of automatically-generated content, according to one embodiment disclosed herein. The method 400 begins at block 405, where the Approval Component 240 selects a first question cluster. At block 410, the Approval Component 240 determines whether the size of the selected cluster exceeds a predefined threshold. If not, the method 400 proceeds to block 445, discussed in more detail below. In one embodiment, the threshold may be defined by a user or administrator. In some embodiments, the threshold is determined in order to allow rapid refinement of the corpus, as well as ensuring that only questions which are seen a sufficient number of times (or sufficiently frequently) are ingested. In one embodiment, the size of the cluster refers to the total number of questions in the cluster, regardless of how recently they were observed or identified. In some embodiments, for purposes of the approval pipeline, the "size" of the cluster may be limited to questions that were identified within a predefined time period (i.e., the last week), regardless of the actual number of questions in the cluster.

If the cluster size exceeds the threshold, the method 400 proceeds to block 415, where the Approval Component 240 submits the cluster for approval. As discussed above, in some embodiments, this comprises displaying each question in the cluster on a GUI for review by a user (such as a subject matter expert). Of course, in some embodiments, the clusters are not reviewed by a human, and are instead ingested immediately into the corpus. In the illustrated embodiment, at block 420, the Approval Component 240 selects a first question in the cluster, and at block 425, the Approval Component 240 determines whether the question was approved or not. Stated differently, the Approval Component 240 determines, for each question, whether the respective question was approved.

If the respective question was not approved, the method 400 continues to block 430, where the question is removed from the cluster. As discussed above, in some embodiments, the question may be assigned to a different cluster using the process discussed above (i.e., identifying an existing cluster associated with an answer that is considered equivalent or matching, as well as determining whether the intent or class of the question matches that cluster). In some embodiments, the question may instead be discarded entirely, or may be used as the first question in a new cluster. The method 400 then proceeds to block 440. Further, for each approved question, the method 400 proceeds to block 435, where the question is ingested. As discussed above, in one embodiment, this may comprise storing the question (with the identified cluster and representative answer) in a corpus (such as the Content Repository 120) accessed by one or more models (such as the Question Answering System 130). In some embodiments, ingesting the question may also include training or refining a machine learning model based on the question.

The method 400 then proceeds to block 440, where the Approval Component 240 determines whether there are additional questions in the cluster that have not yet been processed. If so, the method 400 returns to block 420. Otherwise, the method 400 proceeds to block 445, where the Approval Component 240 determines whether there are additional clusters that have not yet been processed. If so, the method returns to block 405. In some embodiments, the Approval Component 240 may periodically process each cluster (i.e., once a week) to determine whether the size of the cluster exceeds the threshold. In some embodiments, in addition or in the alternative, the Approval Component 240 may complete the method 400 for each respective cluster whenever a question is added to the respective cluster. If there are no additional clusters that currently need to be processed, the method 400 terminates at block 450.

Figure 5:
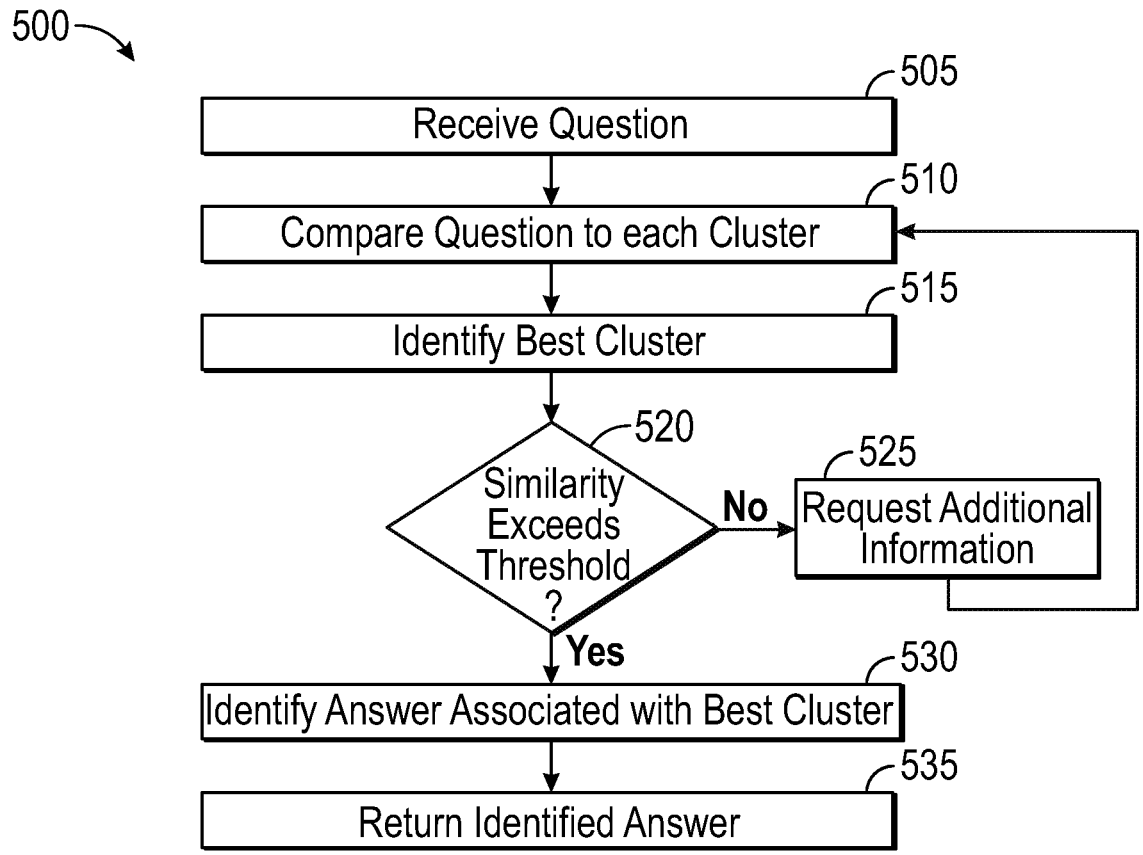
FIG. 5 is a flow chart illustrating a method for deploying a model trained with automatically generated content, according to one embodiment disclosed herein.

FIG. 5 is a flow chart illustrating a method 500 for deploying a model trained with automatically generated content, according to one embodiment disclosed herein. The method 500 is discussed with reference to the Question Answering System 130, for illustrative purposes. Of course, in embodiments, the techniques disclosed herein can be readily applied to any models that utilize corpuses like the Content Repository 120 in operation. The method 500 begins at block 505, where the Question Answering System 130 receives a question from a user. In embodiments, this question may be textual (e.g., typed via a mobile device, computer, laptop, and the like) or may be oral. In some embodiments, oral questions may first be processed using one or more speech-to-text models in order to generate a textual representation of the question. In an embodiment, the user's question may relate to anything, including retrieving information (such as how to do something, troubleshooting, documentation seeking, factual or statistical requests, and the like), requests to complete an action, and the like.

Upon receiving the question, the method 500 proceeds to block 510, where the Question Answering System 130 compares the received question to each cluster defined in the Content Repository 120. As discussed above, in one embodiment, this comparison comprises processing the new question with one or more NLP models (such as classifiers) to determine the intent and concepts present in the question. Based on this information, the Question Answering System 130 can compare the question with each of the previously defined clusters to generate a degree of similarity for each, where the degree of similarity represents a measure of how confident the Question Answering System 130 is that the user's question belongs in the corresponding cluster. The method 500 then proceeds to block 515, where the Question Answering System 130 identifies the cluster that the user's question fits best, based on the generated similarity measures. In an embodiment, the Question Answering System 130 identifies the best cluster as the cluster with the highest confidence or similarity measure.

At block 520, the Question Answering System 130 determines whether the similarity measure exceeds a predefined threshold. Stated differently, at block 520, the Question Answering System 130 determines whether it is sufficiently confident that the user's question should be associated with the identified cluster, such that the corresponding representative answer is sufficiently likely to be a correct and useful answer for the user. If not, the method 500 proceeds to block 525, where the Question Answering System 130 requests additional information from the user. This may include determining which missing information would improve confidence, and generating a question or prompt to the user to provide such information. Upon receiving this additional information, the method 500 returns to block 510 to compare the received information and question to each of the question clusters again. In some embodiments, the Question Answering System 130 may also decline to answer the question, and inform the user of this failure.

If the Question Answering System 130 determines that the similarity measure or confidence value exceeds the predefined threshold, the method continues to block 530, where the Question Answering System 130 identifies the representative answer that is associated with the identified cluster in the Content Repository 120. Finally, at block 535, the Question Answering System 130 returns the identified answer to the user. In embodiments, this may take the form of a textual response or an audio response through the use of one or more text-to-speech models. In some embodiments, the answer may include one or more links to websites or other information, which the Question Answering System 130 may format as a hyperlink such that the user can easily request the additional information. Similarly, in some embodiments, the Question Answering System 130 may indicate that additional information is available, and ask the user whether they wish to retrieve it.

Figure 6:
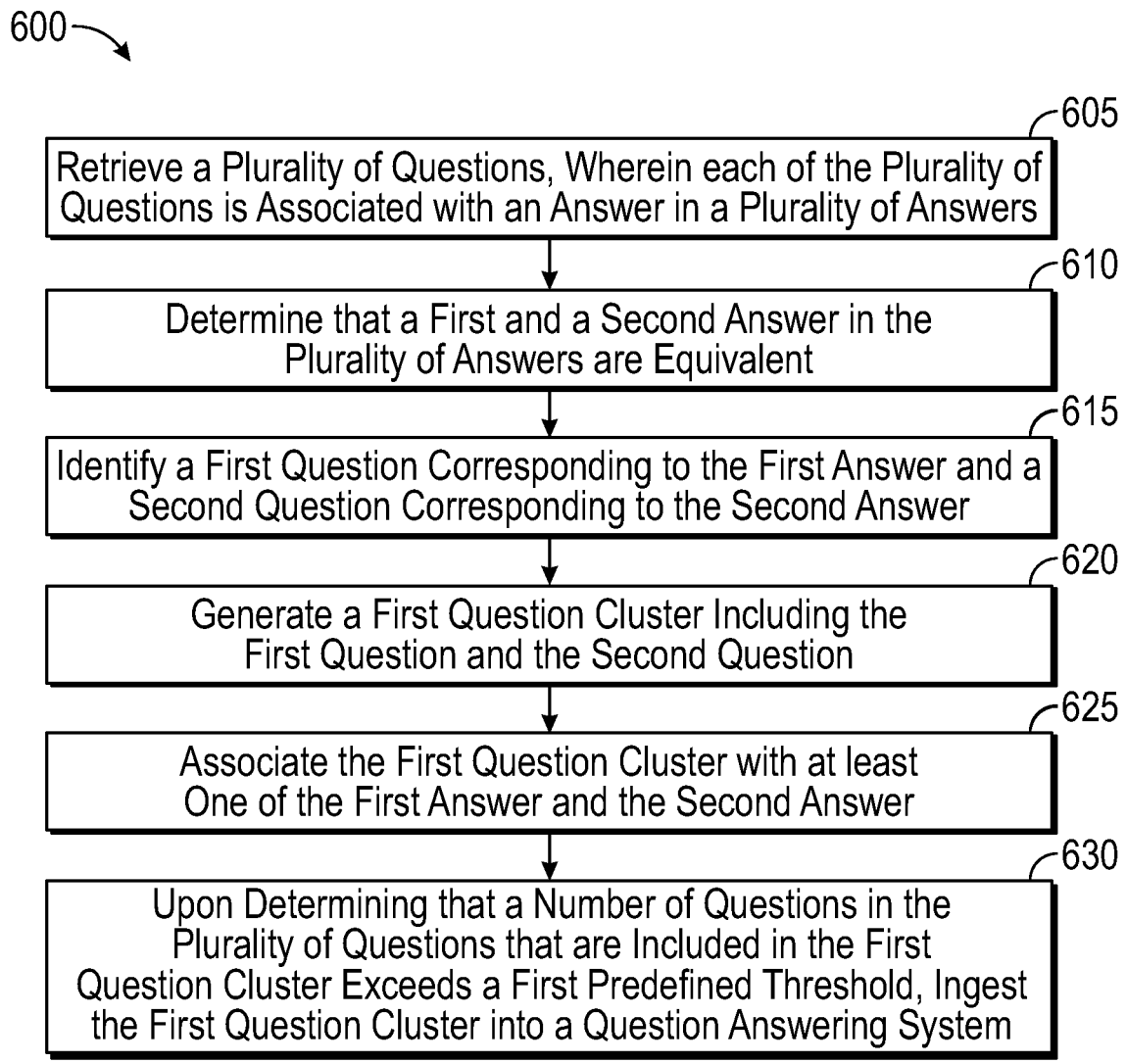
FIG. 6 is a flow chart illustrating a method for automatic generation of training content, according to one embodiment disclosed herein.

FIG. 6 is a flow chart illustrating a method 600 for automatic generation of training content, according to one embodiment disclosed herein. The method 600 begins at block 605, where the Content Generation Application 115 retrieves a plurality of questions, wherein each of the plurality of questions is associated with an answer in a plurality of answers. At block 610, the Content Generation Application 115 determines that a first and a second answer in the plurality of answers are equivalent. The method 600 then proceeds to block 615, where the Content Generation Application 115 identifies a first question corresponding to the first answer and a second question corresponding to the second answer. Further, at block 620, the Content Generation Application 115 generates a first question cluster including the first question and the second question, and at block 625, the Content Generation Application 115 associates the first question cluster with at least one of the first answer and the second answer. Finally, the method 600 continues to block 630, where, upon determining that a number of questions in the plurality of questions that are included in the first question cluster exceeds a first predefined threshold, the Content Generation Application 115 ingests the first question cluster into a question answering system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Content Generation Application 115, QA Resources 105, the Content Repository 120, and the Question Answering System 130) or related data available in the cloud. For example, the Content Generation Application 115 could execute on a computing system in the cloud and identify and retrieve information from the QA Resources 105. In such a case, the Content Generation Application1 115 could identify alternative questions and generate question clusters, and store the identified clusters at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    retrieving a plurality of questions, wherein each of the plurality of questions is associated with an answer in a plurality of answers;
    determining, by operation of one or more computer processors, that a first and a second answer in the plurality of answers are equivalent;
    identifying a first question corresponding to the first answer and a second question corresponding to the second answer;
    generating a first question cluster including the first question and the second question;
    associating the first question cluster with at least one of the first answer and the second answer;
    upon determining that a number of questions in the plurality of questions that are included in the first question cluster exceeds a first predefined threshold, ingesting the first question cluster into a question answering system;
    receiving, by the question answering system, a user question;
    generating a similarity measure by comparing the user question to the first question cluster; and
    upon determining that the similarity measure exceeds a second predefined threshold, returning either the first answer or the second answer.

2. The method of claim 1, wherein determining that the first and second answers are equivalent comprises processing the first and second answers with one or natural language processing (NLP) models.

3. The method of claim 1, wherein generating the first question cluster is performed upon further determining that the first and second questions belong to a first class, wherein determining that the first and second questions belong to the first class comprises processing the first and second questions with one or more natural language processing (NLP) models.

4. The method of claim 3, the method further comprising:
    determining that a third answer in the plurality of answers is equivalent to the first and second answers; and
    upon determining that a third question corresponding to the third answer belongs to a second class, generating a second question cluster including the third question.

5. The method of claim 1, wherein ingesting the first question cluster in the question answering system comprises:
    displaying each question in the first question cluster on a graphical user interface (GUI); and
    receiving approval from a subject matter expert (SME) of each question in the first question cluster.

6. The method of claim 1, wherein associating the first question cluster with at least one of the first answer and the second answer comprises:
    identifying a better answer between the first and second answers; and
    associating the first question cluster with the identified better answer.

7. The method of claim 6, wherein identifying the better answer comprises comparing a first score associated with the first answer and a second score associated with the second answer, wherein the first and second scores were retrieved from a remote resource along with the first and second answers.

8. The method of claim 1, wherein the first question cluster includes a primary question and a plurality of alternate questions, wherein each of the plurality of alternate questions are determined to be equivalent to the primary question.

9. A computer program product comprising:
    a computer-readable storage medium having computer-readable program code embodied therewith, the computer-readable program code executable by one or more computer processors to perform an operation comprising:
        retrieving a plurality of questions, wherein each of the plurality of questions is associated with an answer in a plurality of answers;
        determining that a first and a second answer in the plurality of answers are equivalent;
        identifying a first question corresponding to the first answer and a second question corresponding to the second answer;
        generating a first question cluster including the first question and the second question;
        associating the first question cluster with at least one of the first answer and the second answer;
        upon determining that a number of questions in the plurality of questions that are included in the first question cluster exceeds a first predefined threshold, ingesting the first question cluster into a question answering system;
        receiving, by the question answering system, a user question;
        generating a similarity measure by comparing the user question to the first question cluster; and
        upon determining that the similarity measure exceeds a second predefined threshold, returning either the first answer or the second answer.

10. The computer program product of claim 9, wherein determining that the first and second answers are equivalent comprises processing the first and second answers with one or natural language processing (NLP) models.

11. The computer program product of claim 9, wherein generating the first question cluster is performed upon further determining that the first and second questions belong to a first class, wherein determining that the first and second questions belong to the first class comprises processing the first and second questions with one or more natural language processing (NLP) models.

12. The computer program product of claim 11, the operation further comprising:
    determining that a third answer in the plurality of answers is equivalent to the first and second answers; and
    upon determining that a third question corresponding to the third answer belongs to a second class, generating a second question cluster including the third question.

13. The computer program product of claim 9, wherein associating the first question cluster with at least one of the first answer and the second answer comprises:
    identifying a better answer between the first and second answers; and
    associating the first question cluster with the identified better answer.

14. A system comprising:

one or more computer processors; and a memory containing a program which when executed by the one or more computer processors performs an operation, the operation comprising:

retrieving a plurality of questions, wherein each of the plurality of questions is associated with an answer in a plurality of answers;

determining that a first and a second answer in the plurality of answers are equivalent;

identifying a first question corresponding to the first answer and a second question corresponding to the second answer;

generating a first question cluster including the first question and the second question;

associating the first question cluster with at least one of the first answer and the second answer;

upon determining that a number of questions in the plurality of questions that are included in the first question cluster exceeds a first predefined threshold, ingesting the first question cluster into a question answering system;

receiving, by the question answering system, a user question;

generating a similarity measure by comparing the user question to the first question cluster; and upon determining that the similarity measure exceeds a second predefined threshold, returning either the first answer or the second answer.

15. The system of claim 14, wherein determining that the first and second answers are equivalent comprises processing the first and second answers with one or natural language processing (NLP) models.

16. The system of claim 15, wherein generating the first question cluster is performed upon further determining that the first and second questions belong to a first class, wherein determining that the first and second questions belong to the first class comprises processing the first and second questions with one or more natural language processing (NLP) models.

17. The system of claim 16, the operation further comprising:

determining that a third answer in the plurality of answers is equivalent to the first and second answers; and upon determining that a third question corresponding to the third answer belongs to a second class, generating a second question cluster including the third question.

18. The system of claim 14, wherein associating the first question cluster with at least one of the first answer and the second answer comprises:

identifying a better answer between the first and second answers; and associating the first question cluster with the identified better answer.

\* \* \* \* \*